US 6,653,018 B2

(12) United States Patent
Takahashi et al.

(10) Patent No.: US 6,653,018 B2
(45) Date of Patent: Nov. 25, 2003

(54) ELECTROCHEMICAL DEVICE

(75) Inventors: Tetsuya Takahashi, Chuo-ku (JP); Toshinobu Miyakoshi, Chuo-ku (JP); Tsuyoshi Iijima, Chuo-ku (JP); Kazuya Ogawa, Chuo-ku (JP); Satoshi Maruyama, Chuo-ku (JP)

(73) Assignee: TDK Corporation, Tokyo (JP)

( * ) Notice: Subject to any disclaimer, the term of this patent is extended or adjusted under 35 U.S.C. 154(b) by 239 days.

(21) Appl. No.: 09/809,091

(22) Filed: Mar. 16, 2001

(65) Prior Publication Data

US 2001/0038938 A1 Nov. 8, 2001

(30) Foreign Application Priority Data

| Mar. 17, 2000 | (JP) | 2000-075988 |
| Jun. 16, 2000 | (JP) | 2000-181676 |
| Jun. 16, 2000 | (JP) | 2000-181677 |

(51) Int. Cl.⁷ ............................................... H01M 2/08
(52) U.S. Cl. ..................... 429/185; 429/53; 429/62; 429/127; 429/162
(58) Field of Search ........................ 429/53, 181, 185, 429/162, 62, 127, 61

(56) References Cited

U.S. PATENT DOCUMENTS 5,856,773 A * 1/1999 Chandler et al. ......... 338/22 R
5,964,902 A * 10/1999 Mao et al. ................ 29/623.1
6,048,638 A * 4/2000 Pendalwar ................ 429/127
6,391,491 B1 * 5/2002 Kim ........................ 429/178

FOREIGN PATENT DOCUMENTS

| JP | 10-055792 | * | 2/1998 |
| JP | 11-067188 | | 3/1999 |
| JP | 2001-266814 | * | 9/2001 |
| JP | 2002-008629 | * | 1/2002 |
| JP | 2002-008630 | * | 1/2002 |

* cited by examiner

Primary Examiner—Patrick Ryan
Assistant Examiner—Thomas H. Parsons
(74) Attorney, Agent, or Firm—Oblon, Spivak, McClelland, Maier & Neustadt, P.C.

(57) ABSTRACT

An electrochemical device includes an envelope having a sealable opening and a resin layer on its inner side and an electrochemical element having terminals, wherein the electrochemical element is inserted in the envelope through the opening and sealed therein. A strip of a material different from the resin layer is disposed in the envelope opening and sealed together by thermal fusion so that the strip serves as a pressure relief valve for relieving pressure within the envelope.

23 Claims, 8 Drawing Sheets

ELECTROCHEMICAL DEVICE

BACKGROUND OF THE INVENTION

1. Field of the Invention

This invention relates to electrochemical devices such as polymeric lithium secondary batteries and electric double-layer capacitors, and more particularly, to electrochemical devices having a failsafe mechanism against abnormal inflation and heat release.

2. Description of the Related Art

Various forms of batteries have been used in a wide variety of applications, mainly in electronic and automotive applications and as very large size ones for power storage. In such batteries, liquid electrolytes are often used. The replacement of liquid electrolytes by solid ones is expected to prevent liquid leakage and enable a sheet structure. Use of solid electrolytes is thus attractive for batteries of the next generation.

It is expected that if lithium ion secondary batteries which are frequently used in cellular phones and notebook computers can be fabricated to a small-size, sheet or laminate structure, their application will remarkably grow. For solid electrolytes, there have been proposed ceramic materials, polymeric materials and composite materials thereof. Among these, gel electrolytes in the form of polymer electrolytes plasticized with electrolytic solutions possess both a high electric conductivity inherent to liquid ones and a plastic character inherent to polymeric ones and are deemed potential in the future electrolyte development.

One advantage of batteries using solid electrolytes is an ability to form a thin large area structure, that is, a sheet structure. This will accelerate the further development of battery applications. The advantages of such sheet-shaped batteries are not obtained from the use of metallic casings as used in prior art cylindrical and rectangular batteries. Since the metallic casing accounts for a large proportion of the weight and thickness of the overall battery, the advantages of sheet-shaped batteries are offset. To take advantage of sheet-shaped batteries, it is requisite to use a lightweight laminate film as the casing or envelope.

When any anomaly occurs in a prior art battery using such a film as the envelope, the result is gas release and still worse, ignition, depending on the type of electrolyte. For example, a charger is designed to interrupt charging when the predetermined time or voltage is reached. If charging is not interrupted for some reason or other, the battery is over-charged in excess of its capacity. Further progress of over-charging can cause the electrolyte to be decomposed to give off gases to inflate the envelope, eventually leading to failure of the envelope or ignition.

Lithium ion batteries using metallic casings as the envelope are commercialized as having explosion-proof valves built therein. In the event of laminate film used as the envelope, it is difficult to install an explosion-proof valve and very difficult for such a valve to operate under the necessary pressure.

One technique of providing a laminate film with a valve is disclosed, for example, in JP-A 10-55792. The junction where opposed portions of laminate film are joined is provided with a region of a lower peel strength tapered from the inside to the outside. Usually, the junction is formed by bonding of a fusible resin. The region of lower peel strength is formed by introducing a non-fusible material (e.g., nickel foil) into the fusible resin, by effecting the bonding operation at a lower temperature than in the remaining area, or by leaving the region unbonded.

The lower peel strength region can function as a valve for venting gas when the internal pressure of the battery increases. For the region to exert the desired function, heating conditions during the bonding and/or the non-fusible material must be appropriately selected, which is not always easy in practice. In order that the envelope of laminate film prevent ingress of moisture and undesired contaminants from the exterior, the junction must have a seal width of at least about 4 mm. In the embodiment wherein the region of lower peel strength is defined in the junction by leaving the region unbonded during the bonding step, if the narrow portion of the junction disposed outside the lower peel strength region is 4 mm, the entire junction has a seal width far greater than 4 mm. This is disadvantageous from the energy density standpoint.

To avoid such an undesired phenomenon as rupture or ignition, batteries are normally provided with protective circuits. The protective circuits are often designed to shut off current flow when the predetermined voltage is reached.

However, assuming the situation where the protective circuit fails for some reason or other, a redundant protective means is often provided. Typical protective means are PTC elements and heat-sensitive protective components such as thermal fuses. The PTC elements are elements having a positive temperature coefficient, that is, elements which increase their resistance in response to a temperature rise. A sharp increase of resistance occurs above a certain temperature while the resistance change rate becomes of three figures, and even of six figures for some materials.

In general, chargers are designed to conduct a constant current flow until the predetermined voltage is reached and thereafter, control the current flow at the predetermined voltage. If the battery heats up by any anomaly during the charging process, the PTC element is heated to increase its resistance, thereby restraining the charging current flow for inhibiting further charging. The thermal fuse functions to shut off the charging current flow when the predetermined temperature is reached, interrupting the charging process. It is well known that lithium ion secondary batteries undergo thermal runaway above a critical temperature. The thermal runaway produces gases or further heat, inducing a failure or ignition of the battery. Therefore, the charging current flow must be reduced or shut off before the battery temperature reaches the critical level.

When a protective component is attached to the surface of an envelope, the maximum thickness of the battery including that protective component is often increased. Such a thickness increase is undesirable because electronic equipment such as cellular phones in which batteries are mounted are currently required to be smaller in size and thickness. It is thus desired to attach the protective component to the battery at a location aside from the maximum thickness.

However, the surface temperature of the battery is not always uniform. High heat radiating areas and low heat transfer areas have lower temperatures. Depending on the attachment location of the protective component, there is a possibility that the protective component operates at a lower temperature than other areas. This delays the time when the charging operation is interrupted, failing to prevent gas generation or ignition.

As mentioned above, even when the protective circuit is provided, there is a possibility that the protective circuit fails for some reason or other. Even in such a case, safety must be insured. When only a gas venting mechanism is added, a fire hazard can still be left because the charging operation continues even after the gas venting.

SUMMARY OF THE INVENTION

A first object of the invention is to provide an electrochemical device having reliability and safety owing to a simple venting means for venting gas in response to a rise of the internal pressure, the venting means serving as an explosion-proof valve and preventing ingress of moisture and contaminants.

A second object of the invention is to provide an electrochemical device comprising an envelope of flexible film having a protective component attached thereto, which is designed, without changing the maximum thickness of the device, to ensure that heat is transferred from the interior to the protective component whereby the device has improved safety.

A third object of the invention is to provide an electrochemical device, typically secondary battery, comprising an envelope of flexible film and a failsafe mechanism capable of preventing current flow on a gas generating accident.

In a first embodiment, the invention provides an electrochemical device comprising an envelope having a sealable opening, an electrochemical element having terminals, the electrochemical element being inserted in the envelope through the opening which is sealed to form a seal, the envelope having a resin layer on its inner side adjacent the electrochemical element, and a strip of a material different from the resin layer of the envelope, disposed in at least a portion of the seal, the strip serving as a means for relieving pressure within the envelope.

In a preferred embodiment, the sealable opening of the envelope is defined by opposed portions of the resin layer of the envelope, the strip is interposed at least in part between the opposed portions of the resin layer, and a seal is formed by joining the opposed portions of the resin layer together with the strip to provide the pressure relief means.

The strip is preferably made of a resin mixture of a first resin adhesive to the resin layer of the envelope and a second resin non-adhesive to the resin layer. Typically, the resin layer of the envelope is made of a first polyolefin resin, and the strip is disposed in contact with the resin layer and made of a resin mixture of the first polyolefin resin and a second polyolefin resin non-adhesive to the first polyolefin resin. Specifically, either one of the first and second polyolefin resins comprises polypropylene, and the other resin comprises polyethylene. Preferably, the resin mixture of which the strip is made contains a more amount of the second polyolefin resin than the first polyolefin resin. Specifically, the resin mixture of which the strip is made contains the first polyolefin resin and the second polyolefin resin in a weight ratio of from 40/60 to 15/85.

In a preferred embodiment, the terminals extend through the seal of the envelope, and the strip is disposed in the portion of the seal excluding the location of the terminals.

In a second embodiment, the invention provides an electrochemical device comprising an envelope, an electrochemical element received and sealed in the envelope, and a heat-sensitive protective component for protecting the electrochemical element, the heat-sensitive protective component being attached to the envelope substantially outside the electrochemical element.

Provided that the electrochemical device has a maximum thickness $D_1$ where the electrochemical element is received and a maximum thickness $D_2$ where the heat-sensitive protective component lies, $D_1$ is equal to or greater than $D_2$.

Where the electrochemical device further comprises an internal electrode extending from the electrochemical element, a tab extending from the internal electrode, and an external electrode extending from the tab, the heat-sensitive protective component preferably lies at the location where any of the internal electrode, the tab and the external electrode is disposed.

Preferably the electrochemical device of the second embodiment has the pressure relief means of the first embodiment.

In a third embodiment, the invention provides an electrochemical device comprising a flexible envelope, an electrochemical element received and sealed in the envelope, the electrochemical element including internal electrodes and external electrodes electrically connected to the internal electrodes and extending outside the envelope, and current shut-off means for shutting off either of the electrical connections between the internal electrodes and the external electrodes by detecting the stress created by inflation of the envelope.

Preferably the current shut-off means breaks the mechanical connection between the internal electrode and the external electrode by utilizing the stress. Preferably the internal electrode and the external electrode are attached to the envelope such that the connection between the internal electrode and the external electrode is preferentially broken by the stress. Provided that the internal electrode is attached to the envelope at a tensile strength A, the external electrode is attached to the envelope at a tensile strength B, and the internal electrode is connected to the external electrode at a tensile strength C, C is lower than A, and C is lower than B.

Preferably the electrochemical device of the third embodiment has the pressure relief means of the first embodiment and/or the heat sensitive protective component of the second embodiment.

In all the embodiments, the electrochemical device typically comprises a lithium secondary battery.

DESCRIPTION OF THE PREFERRED EMBODIMENTS

Embodiment 1

Figure 1A:
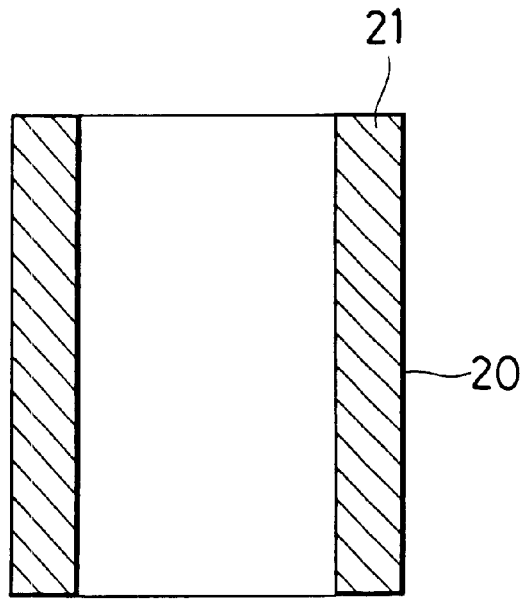
FIGS. 1A and 1B illustrate a sheet-shaped battery according to a first embodiment of the invention, FIG. 1A being a plan view of an envelope prior to insertion of an electrochemical element, FIG. 1B being a plan view of the envelope having the electrochemical element contained therein.

In a first embodiment of the invention, an electrochemical device includes an envelope having a sealable opening and an electrochemical element having terminals. The electrochemical element is sealed in the envelope. The envelope is formed of a sheet having a resin layer on its inner side disposed adjacent to the electrochemical element. Once the electrochemical element is inserted into the envelope through the opening, the opening is sealed. According to the invention, a strip of a material different from the resin layer of the envelope sheet is disposed in at least a portion of the seal so that the strip serves as a means for relieving pressure within the envelope. More particularly, the opening of the envelope sheet is sealed by joining the opposed edge portions of the resin layer on the envelope sheet to form a seal. In forming the seal, the strip is interposed between the resin layer edge portions, which are joined together whereby the strip forms the pressure relief means or venting seal. The strip is preferably made of a resin mixture of a first resin adhesive to the resin layer of the envelope sheet, which is most preferably the same resin as the resin layer of the envelope sheet, and a second resin non-adhesive to the resin layer. The resin layer of the envelope is preferably comprised of polyolefin resins such as polypropylene and polyethylene. Since polypropylene and polyethylene are not adhesive to each other, a combination of polypropylene and polyethylene is recommended.

The term "non-adhesive" means that when an attempt is made to join a sheet of a first resin and a sheet of a second resin together by suitable means such as heat, they are not joined or bonded because no chemical admixing occurs at their interface. The term "adhesive" means that two resin sheets can be joined and bonded together as a result of chemical admixing at their interface.

The strip intervenes in the seal of the envelope such that the strip defines a region of weak bonding force in the seal, which serves as a pressure relieving means or venting seal. When gases generate to increase the internal pressure of the envelope, the pressure relief means allows the gases to be discharged. The electrochemical device is endowed with the function of an explosion-proof valve and thus improved in safety and reliability. The bonding force of the strip is usually about 50 to 90% of the bonding force of the remaining seal when the pressure contemplated herein is of an order as in Examples to be described later.

In a preferred embodiment, the pressure relief means can be formed by interposing the strip of resin mixture between the resin layer edge portions of the envelope and joining them as by thermal fusion. The seal forming operation is simple. Since the strip is positioned within the seal, it causes no disadvantage from the energy density standpoint. Normally, the strip has some bonding force and the same width as the remaining seal and eliminates the problem of moisture ingress from the outside. The relief pressure of the valve can be adjusted by changing the mixing ratio of different resins in the strip. The desired relief pressure can be set simply by furnishing a strip made of a mixture of different resins in a prescribed ratio. The seal forming operation is simple in this regard too. More particularly, the relief pressure of the valve increases as the proportion of the first resin adhesive to the resin layer of the envelope increases, and inversely, the relief pressure decreases as the proportion of the adhesive resin decreases. Most often, the proportion of the adhesive resin is less than the proportion of the non-adhesive resin.

In a preferred embodiment, the resin mixture of which the strip is made contains the first resin adhesive to the resin layer of the envelope (desirably the same polyolefin resin as the resin layer) and the second resin non-adhesive to the resin layer of the envelope (desirably another polyolefin resin) in a weight ratio of from 40/60 to 15/85.

Preferably the strip of the resin mixture is prepared by intimately mixing the first resin adhesive to the resin layer of the envelope and the second resin non-adhesive to the resin layer of the envelope and sheeting the mixture to a thickness of 10 to 200 microns, preferably 50 to 150 microns. This sheeting may be done by known methods.

The shape of the strip is not critical. The strip may have various shapes including rectangular (inclusive of square), circular, elliptic and triangular shapes although rectangular strips are often used. One side of a rectangular strip is preferably equal to the width of the seal. This is simply achieved by cutting the strip and the envelope together. The other side of the rectangular strip preferably has a distance of about 2 to 20 mm, more preferably about 4 to 15 mm, but is not limited thereto because the relief pressure largely varies depending on seal-forming conditions.

The position of the strip in the seal is not critical. Usually the terminals extend through the seal of the envelope, and the strip is preferably disposed in the portion of the seal excluding the location of the terminals. For a particular shape of the envelope, the seal portion is bent or otherwise worked. In this case, since the relief pressure of the valve is changed by bending, the strip is preferably disposed in a portion of the seal outside the bend. Also preferably, the strip is positioned nearer to a substantially central axis of the electrochemical element in order that the strip serve as the pressure relief valve, although the position of the strip also depends on the shape of the envelope.

Figure 1B:
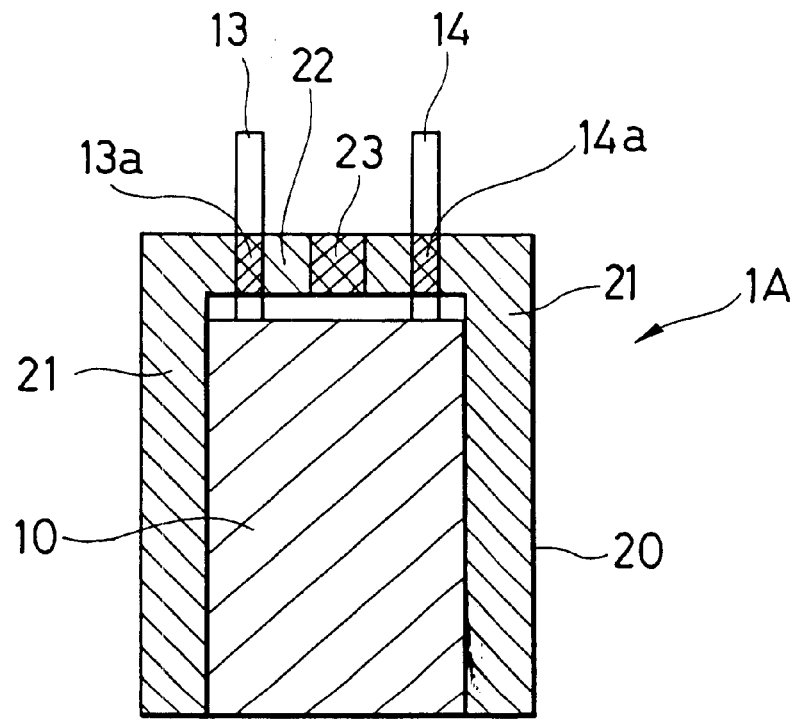

Referring to FIGS. 1A and 1B, there is illustrated a sheet-shaped electrochemical device according to the first embodiment of the invention. FIG. 1A is a plan view of a bag-like envelope. FIG. 1B is a plan view of electrochemical device comprising a electrochemical element received in the envelope.

As shown in FIG. 1A, the envelope 20 is a bag obtained by folding a sheet of laminate film and joining opposite sides by thermal fusion to form a pair of first seal portions 21. In the plan view of FIG. 1A, the bag envelope 20 is rectangular and has the fold at the lower side and an opening at the upper side. The fold and the seal portions 21 define an interior space.

As shown in FIG. 1B, an electrochemical element 10 having terminals 13, 14 is inserted-into the interior space of the envelope 20 through the opening such that the terminals 13, 14 extend outward through the opening. The opening-defining opposed portions of the envelope 20 between which the terminals 13, 14 are interposed are joined by thermal fusion to form a second seal portion 22, completing an electrochemical device 1A. The device 1A is structured such that the electrochemical element 10 is sealed within the envelope 20 and the terminals 13, 14 extend outward through the second seal portion 22.

The electrochemical element 10 includes positive and negative electrodes and a solid polymer electrolyte (SPE). Each electrode includes a current collector such as a aluminum foil or copper foil to which a coating material of an active material, a binder, etc. is applied. To the positive and negative electrodes are connected the terminals 13, 14. The terminals 13, 14 include sealed regions 13a, 14a where they are covered with the second seal portion 22.

The bag-like envelope 20 is formed by folding a sheet because the extra area which is otherwise necessary for sealing of the lower end is eliminated. In this embodiment, a strip 23 is preferably disposed in the second seal portion 22 to provide a valve function. More preferably, the strip 23 is disposed in a portion of the second seal portion 22 outside the location of the terminals 13, 14, that is, outside the sealed regions 13a, 14a. In the illustrated embodiment, the strip 23 is disposed substantially at the center between the terminals 13 and 14. The position of the strip 23 is not limited to the center, and may be anywhere as long as an area enough to accommodate the strip is available.

It is noted that the electrochemical element 10 with terminals 13, 14 is subjected to the prescribed treatments including immersion in an electrolytic solution before it is contained in the envelope 20. While the terminals 13, 14 are extended outside and the strip 23 is interposed between the opening-defining edge portions of the envelope 20, the opening-defining edge portions of the envelope are joined by heat compression or thermal fusion to form the second seal portion 22.

Figure 2A:
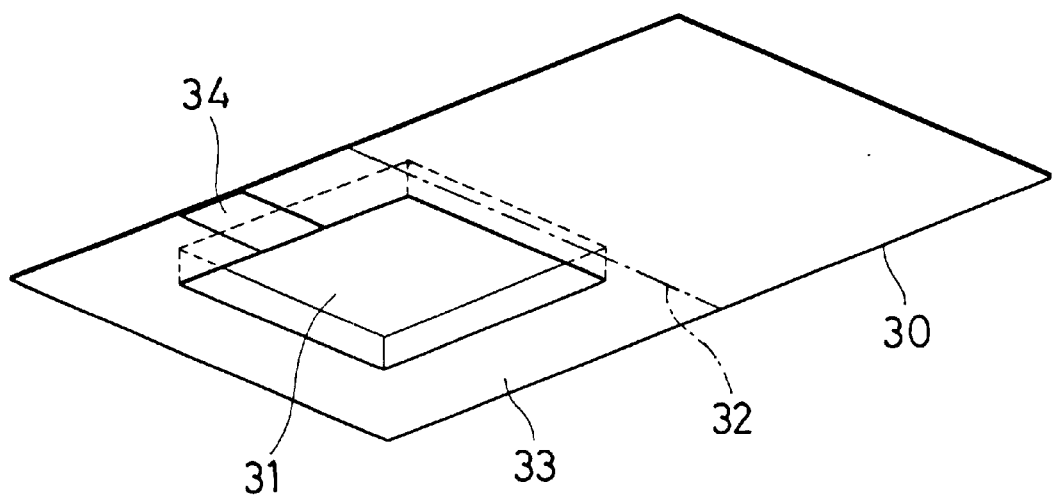
FIGS. 2A and 2B illustrate a sheet-shaped battery according to another embodiment of the invention, FIG. 2A being a perspective view of an extended envelope prior to insertion of an electrochemical element, FIG. 2B being a perspective view of the envelope having the electrochemical element contained therein.
Figure 2B:
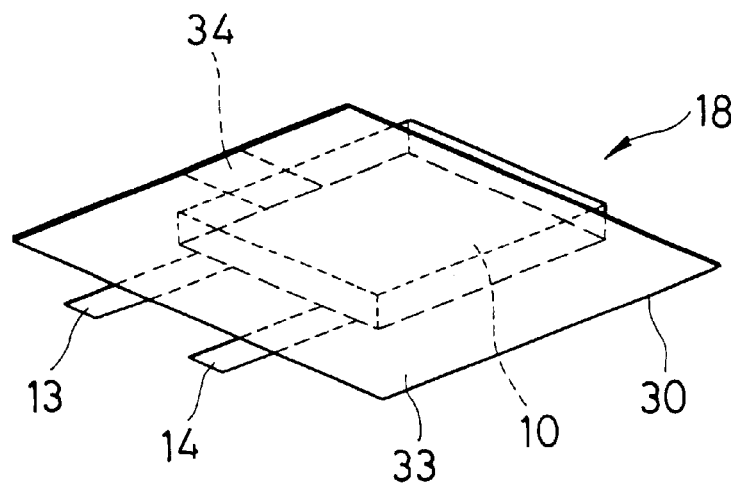

The electrochemical device is not limited to the embodiment of FIGS. 1A and 1B and may be constructed as shown in FIGS. 2A and 2B. FIGS. 2A and 2B illustrate an electrochemical device using an envelope having a recess substantially corresponding to the size of the electrochemical element. FIG. 2A is a perspective view showing an extended envelope and FIG. 2B is a perspective view of the electrochemical device.

As shown in FIG. 2A, a rectangular envelope sheet 30 has a recess 31 capable of accommodating the electrochemical element 10 which is the same as in FIGS. 1A and 1B except for terminals 13, 14, not shown in FIG. 2A. In the recess 31, the electrochemical element 10 is placed following the prescribed treatments (including immersion in electrolytic solution). A strip 34 is placed on a seal-forming portion 33 of the envelope sheet 30 surrounding the recess 31. The envelope sheet 30 is folded along a line 32. The mated portions of the envelope sheet are joined by heat compression or thermal fusion to form a seal 33 (see FIG. 2B).

Constructed in this way is an electrochemical device 18 as shown in FIG. 2B. The electrochemical element 10 is accommodated and sealed in the envelope 30 while terminals 13, 14 extend out of the envelope 30. The strip 34 serving as a valve is positioned in the seal 33 and near to a substantially central axis of the electrochemical element 10 and sandwiched between the opposed portions of the envelope 30.

The electrochemical device of the invention is not limited to the illustrated embodiments, and modifications are made thereto. The envelope may be configured to any desired shape depending on a particular purpose or application.

The heat compression or thermal fusion to form a seal can be effected by known methods.

The envelope used in the electrochemical device of the invention may be formed of a sheet material which is relatively unbreakable and bondable, which does not undergo chemical changes upon contact with the electrochemical element, and which prevents leakage of electrolytic solution and gas permeation. A typical sheet is a laminate film in the form of a metal layer such as aluminum which is coated on opposite surfaces with a thermal fusible resin layer such as a polyolefin resin layer (e.g., polypropylene or polyethylene) and a heat resistant polyester resin layer. The thermal fusible resin layer such as a polyolefin resin layer becomes the resin layer on the inner side to be in contact with the electrochemical element.

The thermal fusible resin layer on the inner side of the laminate film is often a single layer although it may have a multilayer structure. The thickness of the resin layer (total thickness in the case of two or more layers) is preferably about 30 to 130 microns. This thickness range ensures to form an effective seal on thermal fusion. If the resin layer is thinner below the range, it may become difficult to form an effective seal around the terminals because the terminals are generally about 50 to 100 microns thick. If the resin layer is thicker beyond the range, heat may not be fully transferred from a heating plate to the terminals, failing to form an effective seal. The thick resin layer adds to the overall thickness of the battery against the demand for size reduction.

The metal layer is often a single layer although it may have a multilayer structure. The thickness of the metal layer (total thickness in the case of two or more layers) is preferably about 15 to 150 microns.

The heat resistant resin layer on the outer side of the metal layer preferably has a thickness of about 10 to 50 microns (total thickness in the case of two or more layers). The laminate film preferably has an overall thickness of about 50 to 200 microns. A heat resistant resin layer may be additionally formed between the metal layer and the thermal fusible resin layer in order to ensure insulation. When provided to this end, the additional heat resistant resin layer preferably has a thickness of about 5 to 20 microns.

The thermal fusible resins used herein are typically polyolefin resins including polypropylene and polyethylene (including high density polyethylene, low density polyethylene, linear low density polyethylene and polyethylene base ionomers). Also useful are acid-modified polyolefin resins, for example, polyethylene modified with acid such as carboxylic acid, and acid-modified polypropylene obtained by graft polymerization of maleic anhydride. These acid-modified polyolefin resins are advantageously used herein because carboxyl groups thereon contribute to improved adhesion.

The acid-modified polypropylene obtained by graft polymerization of maleic anhydride is commercially available under the trade name of Admer from Mitsui Chemicals Co., Ltd. Among the Admers, polypropylene type Admers are preferred. Especially preferred are homopolymers Admer QF305 (melting point 160° C.) and QF500 (melting point 165° C.) and ethylene copolymers Admer QF551 (melting point 135° C.), QB540 (melting point 150° C.), QB550 (melting point 140° C.), and QE060 (melting point 139° C.). Similar resins are commercially available under the trade name of Modic from Mitsubishi Chemical Corp. The Modic polypropylene resins include a homopolymer Modic P502, and random copolymers Modic P513V, P505 and P517.

The heat resistant resins are preferably polyester resins such as polyethylene terephthalate (PET) and polyamide resins.

The metal layer of aluminum etc. may be a metal foil or an evaporated film.

The terminals may be foils of various metals and alloys such as aluminum, nickel, copper and stainless steel which may be surface coated with titanium, tantalum, chromium, zinc, nickel or tin. The terminals often take the form of a lead of rectangular or circular cross section. Terminals of aluminum and nickel are preferred. To enhance the adhesion to the envelope, adhesives such as the acid-modified polyolefin resins described above may be applied to the seal regions of the terminals to come in contact with the envelope.

Embodiment 2

Figure 4:
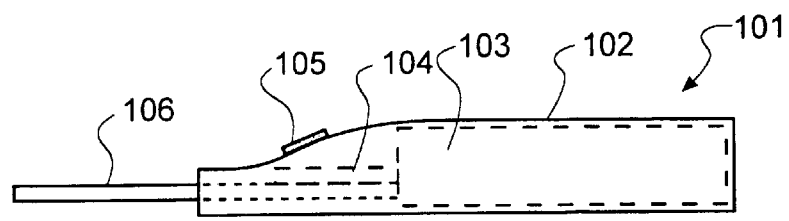
FIG. 4 is a schematic side view of an electrochemical device according to a second embodiment of the invention.

In a second embodiment of the invention, the electrochemical device is illustrated in FIG. 4 as comprising an envelope 102, an electrochemical element 103 received in the envelope 102, and a heat-sensitive protective component 105 for protecting the electrochemical element 103. The heat-sensitive protective component 105 is disposed on the envelope 102 substantially outside the electrochemical element 103.

In a preferred embodiment, provided that the electrochemical device has a maximum thickness $D_1$ where the electrochemical element is received and a maximum thickness $D_2$ where the heat-sensitive protective component is disposed, $D_1$ is equal to or greater than $D_2$ (i.e., $D_1 \geq D_2$). In a preferred embodiment, the heat-sensitive protective component is disposed at the location where any of an internal electrode, a tab and an external electrode is disposed.

Since the heat-sensitive protective component 105 is disposed on the envelope 102 substantially outside the electrochemical element 103, the heat-sensitive protective component 105 can be attached without increasing the maximum thickness of the electrochemical device.

As shown in FIG. 4, the electrochemical device 101 includes the envelope 102, the electrochemical element 103 received in the envelope 102, an internal electrode extending from the electrochemical element, a tab 104 extending from the internal electrode, and an external electrode 106 extending from the tab 104 and out of the envelope 102. (In the illustrated embodiment, the tab is integral with the internal electrode.) In the region of the envelope 102 which is substantially outside the electrochemical element 103, the envelope 102 has sealed therein only the internal electrode, tab 104 or external electrode 106. Therefore, the region of the envelope 102 outside the element 103 is a slim region having a reduced thickness (or height). The location of the heat-sensitive protective component 105 in the slim region (having the maximum thickness $D_2$) provides effective utilization of an extra space and does not increase the maximum thickness $D_1$ of the electrochemical device 101.

The heat-sensitive protective component 105 may be attached either outside or inside the envelope 102. For ease of attachment, it is recommended that the component 105 be attached outside the envelope 102. For reliable operation and protection from the ambient atmosphere, the component 105 may be attached inside the envelope 102.

Since the maximum thickness $D_3$ of the heat-sensitive protective component 105 is usually smaller than the difference between the maximum thickness $D_1$ of the electrochemical device and the maximum thickness $D_2$ of the slim region (i.e., $D_1 - D_2 \geq D_3$), the location of the heat-sensitive protective component 105 in the slim region does not increase the maximum thickness $D_1$ of the electrochemical device 101. The maximum thickness $D_1$ of the electrochemical device 101 is not less than the maximum thickness $D_2$ of the slim region where the heat-sensitive protective component 105 is disposed (i.e., $D_1 \geq D_2$).

Figure 5:
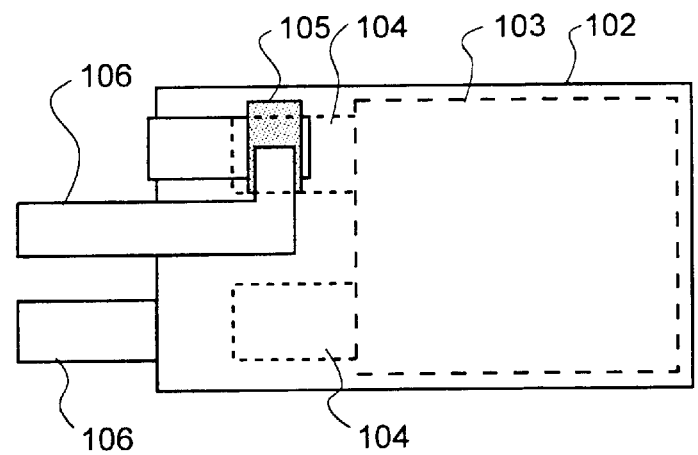
FIG. 5 is a plan view of the device of FIG. 4.

In the preferred embodiment, the heat-sensitive protective component 105 is disposed at the location where any of the internal electrode, the tab 104 and the external electrode 106 is disposed as best shown in FIG. 5. In the case of a lithium secondary battery, the electrochemical device 101 has the electrochemical element 103 sealed in the envelope 102, the electrochemical element 103 being a laminate of a positive electrode (internal electrode), an electrolyte and a negative electrode (internal electrode). The external electrodes or out-leads 106 from the electrochemical element extend out of the envelope 102. The open ends (left side in FIGS. 4 and 5) of the envelope 102 with the external electrodes 106 sandwiched are joined by thermal fusion to form a seal portion. Since the internal electrodes, tabs and external electrodes are usually made of metals having relatively enhanced heat transfer, they serve to transfer heat from the interior. As a consequence, the heat-sensitive protective component located on the region of the envelope where such metal members are sealed is improved in operating sensitivity. Differently stated, the heat-sensitive protective component can be operated at a temperature closer to the internal temperature.

In the region of the envelope which is substantially outside the electrochemical element, a temperature difference of 10° C. or more is sometimes found between the zone where the internal electrodes, tabs or external electrodes are located and the other zone where they are not.

The arrangement that the heat-sensitive protective component 105 is disposed at the location where any of the internal electrode, the tab 104 and the external electrode 106 is disposed means that the overlap between the projected area of the heat-sensitive protective component and the projected area of the internal electrode, tab or external electrode, as viewed from above in FIG. 5, is at least 50%, more preferably at least 70%, and most preferably at least 80% of the projected area of the heat-sensitive protective component.

The heat-sensitive protective component 105 used herein is not critical as long as it can detect the heat release of the electrochemical element and shut off or restrict current flow at a predetermined temperature and has a sufficient shape to dispose in the above-specified position.

Exemplary heat-sensitive protective components are thermal fuses and PTC elements. Organic PTC elements or thermistors are based on the construction that electrically conductive particles are dispersed in a resin matrix as disclosed, for example, in JP-B 64-3322 and JP-B 4-28743. By adjusting the type and proportion of the resin, conductive particles and other components, the organic PTC element can be readily controlled in operating temperature and be endowed with so-called hysteresis characteristics. Owing to resin molding, the organic PTC element can be freely designed to an optimum shape to fit in the specified position.

The heat-sensitive protective component may be secured to the envelope using a heat conductive paste or sheet, which is preferred from the heat transfer standpoint. The securing may be done by various means including adhesives, adhesive tapes, screws, rivets and pressure bonding of an outer casing. Use of heat conductive adhesives is preferred. The adhesive for bonding the protective component should preferably be one that does not experience a weakening of the bonding force in the temperature range between −40° C. and 160° C. Typically, heat conductive epoxy adhesives are useful.

The heat-sensitive protective component may be attached on either the positive electrode side or the negative electrode side or both as long as it can shut off or restrict the current flow.

Embodiment 3

A third embodiment of the invention provides an electrochemical device comprising a flexible envelope and an electrochemical element received and sealed in the envelope. The electrochemical element includes internal electrodes and external electrodes electrically connected to the internal electrodes and extending outside the envelope. The device further comprises current shut-off means for shutting off either of the electrical connections between the internal electrodes and the external electrodes by detecting the stress created by inflation of the envelope.

In a preferred embodiment, the current shut-off means breaks the mechanical connection between the internal electrode and the external electrode by utilizing the stress. The internal electrode and the external electrode are attached to the envelope such that the connection is preferentially broken by the stress. More specifically, the internal electrode is attached to the envelope at a tensile strength A and the external electrode is attached to the envelope at a tensile strength B, and the internal electrode is connected to the external electrode at a tensile strength C such that C is lower than A, and C is lower than B (i.e., A>C and B>C). It is preferred that A>2C and B>2C, especially A>5C and B>5C.

Conventional adhesives are used in attaching the internal electrode and the external electrode to the envelope at tensile strengths A and B, respectively. More particularly, adhesives for use in sealing the external electrode in the seal portion of the envelope are suitable. Exemplary adhesives are carboxylic acid and similar acid-modified polyethylene, acid-modified polypropylene, epoxy resins and modified isocyanate adhesives.

The tensile strengths at which the internal and external electrodes are attached to the envelope are not critical insofar as the above-described relationship is met. The tensile strength per unit area is often in the range of about 20 to 100 gf/mm$^2$, especially about 30 to 65 gf/mm$^2$.

Means for attaching the internal electrode to the external electrode at tensile strength C may be conventional means for joining metal members such as adhesive bonding, welding, soldering and brazing. Among these, ultrasonic welding is preferred because the bond stress is readily adjustable. In the ultrasonic welding, the bond stress is adjusted by controlling any one of the ultrasonic power, welding time and applied pressure or two or more such factors in combination.

The tensile strength at which the internal electrode is attached to the external electrodes is not critical insofar as the above-described relationship is met. The tensile strength per unit area is often in the range of about 3 to 30 gf/mm$^2$, especially about 6 to 13 gf/mm$^2$.

When the envelope is inflated, a stress of about 20 to 100 gf/mm$^2$ is usually exerted.

Figure 8:
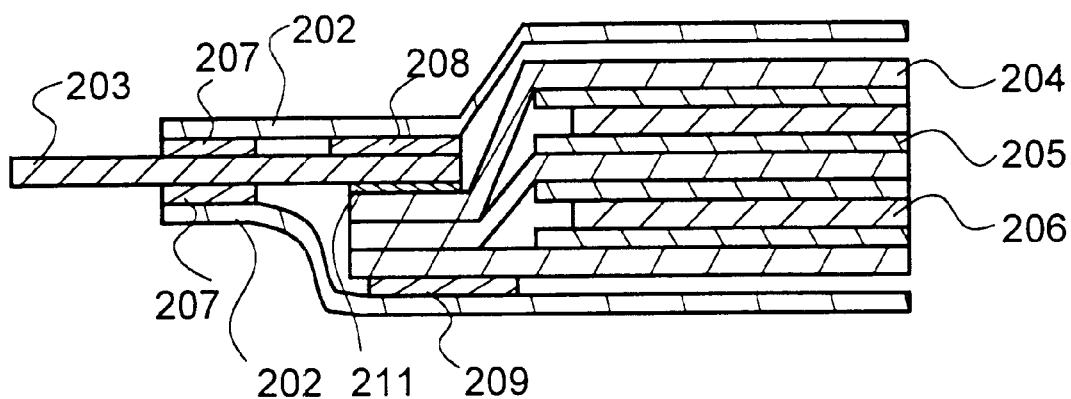
FIG. 8 is a schematic cross-sectional view of an electrochemical device according to a third embodiment of the invention.
Figure 9:
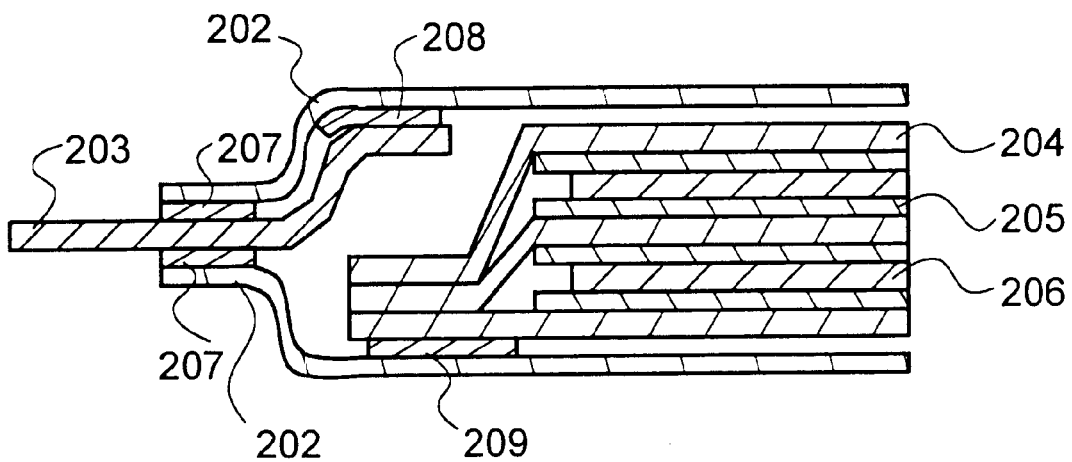
FIG. 9 is a view similar to FIG. 8, showing the envelope in the inflated state.

Referring to FIG. 8, there is illustrated an electrochemical device according to the third embodiment of the invention. FIG. 9 is a view similar to FIG. 8, showing the state that the envelope 202 is inflated by gas release.

The electrochemical device of FIG. 8 includes an electrochemical element having a stack of positive electrode layers 204, electrolyte layers 205 and negative electrode layers 206, which is sealed in an envelope 202. The electrochemical element is received in the envelope 202 such that an external electrode or out-lead 203 extend out of the envelope 202. Open ends of the envelope 202 with the external electrode 203 sandwiched therebetween are joined by thermal fusion to form a seal portion 207. The electrochemical device is configured such that the electrochemical element is sealed within the envelope 202 and the external electrode 203 extends outward through the seal portion 207. At this point, the interior of the envelope 202 is substantially vented whereby the envelope comes in close contact with the electrochemical element. It is noted that FIGS. 8 and 9 show a portion of the electrochemical element and envelope which is disposed near the external electrode.

In the illustrated embodiment, the external electrode 203 is secured to the top side of the envelope 202 by an adhesive layer 208 while the (lowermost) internal or positive electrode 204 is secured to the bottom side of the envelope 202 by an adhesive layer 209. The external electrode 203 is connected to the internal or positive electrode 204 by a joint 211.

On an abnormal event such as over-charging, gases are generated to inflate the envelope 202. Specifically, the envelope 202 is dilated upward and downward directions as viewed in FIG. 8 so that a stress acts to separate the external and internal electrodes 203 and 204 at the joint 211. On further inflation by gas generation, the stress by inflation eventually surpasses the bond stress C between the external electrode 203 and the internal or positive electrode 204, breaking the bond or connection of the joint 211. That is, the connection between the external and internal electrodes 203 and 204 is broken. Breakage of connection may occur on the positive electrode side or the negative electrode side or both. Once the connection on either side is broken, current flows no longer, insuring safety.

At this point, since the stresses A and B at which the external and internal electrodes 203 and 204 are secured to the envelope 202 by the adhesive layers 208 and 209, respectively, are greater than the bond stress C between the external and internal electrodes 203 and 204, adhesive failure at the joint 211 preferentially occurs. Since adhesive failure suddenly occurs after the envelope 202 is inflated to a substantial extent, the external and internal electrodes 203 and 204 are instantaneously separated at the same time as failure as shown in FIG. 9. In this way electrical connection is shut off. Since the inflated state is maintained thereafter, the connection is not restored.

Figure 10:
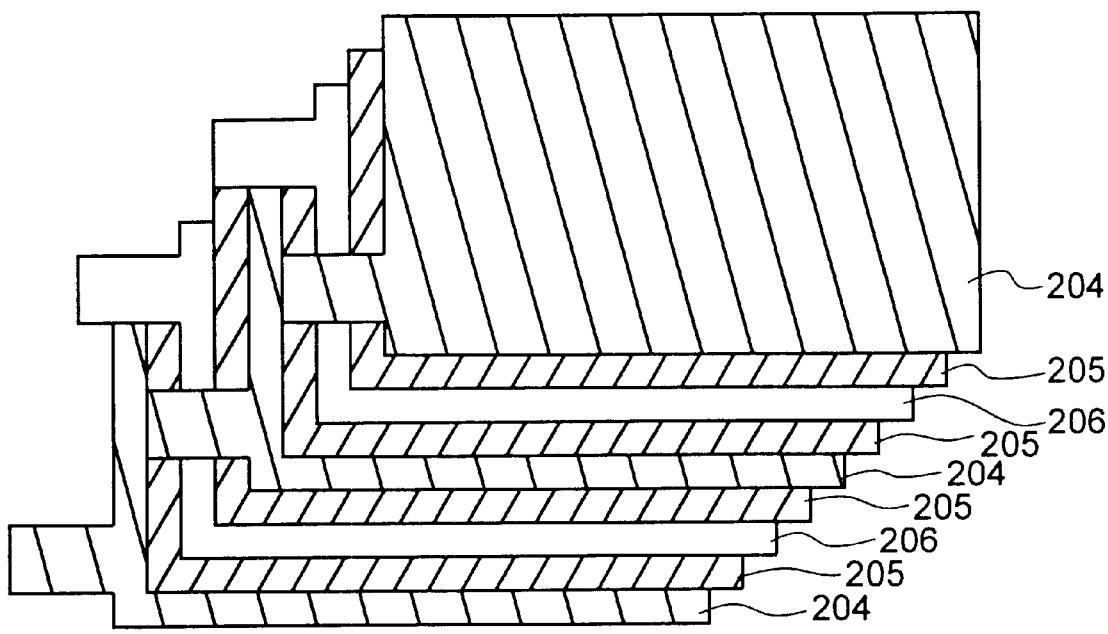
FIG. 10 is an exploded perspective view showing the structure of the electrochemical device of FIG. 8.

The electrochemical element is illustrated in FIG. 10 as a multilayer structure comprising positive and negative electrodes 204 and 206 each in the form of a metal foil such as aluminum or copper foil, and solid polymer electrolyte layers 205, which are alternately stacked. To the positive and negative electrodes 204 and 206 are connected external electrodes or out-leads 203. It is noted that the external electrode to the negative electrodes is omitted in FIGS. 8 and 9. The external electrodes each are formed of a metal foil of aluminum, copper, nickel, stainless steel or the like. The external electrode 203 includes a sealed region covered with the adhesive layer 207.

Figure 11:
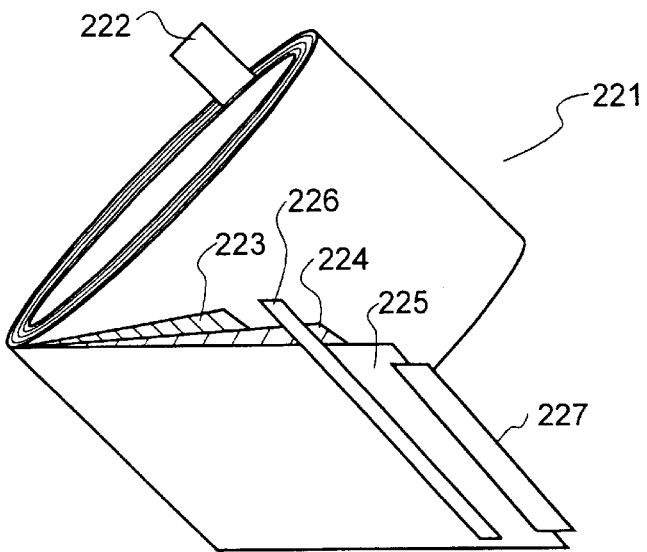
FIG. 11 is a perspective view of an electrochemical device according to a further embodiment of the invention.
Figure 12:
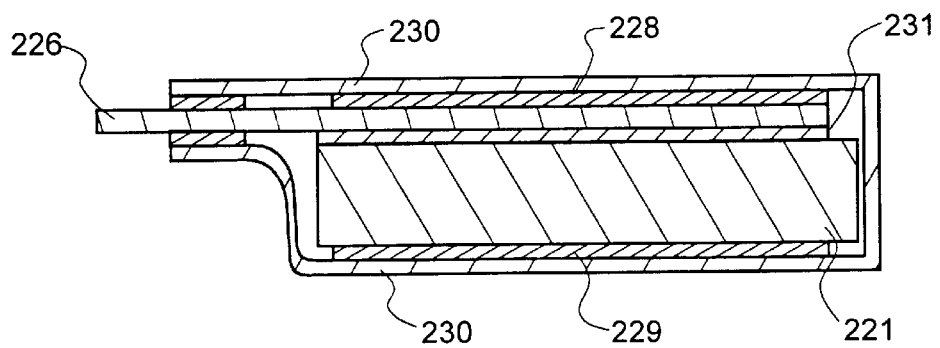
FIG. 12 is a schematic cross-sectional view of an electrochemical device according to a still further embodiment of the invention.
Figure 13:
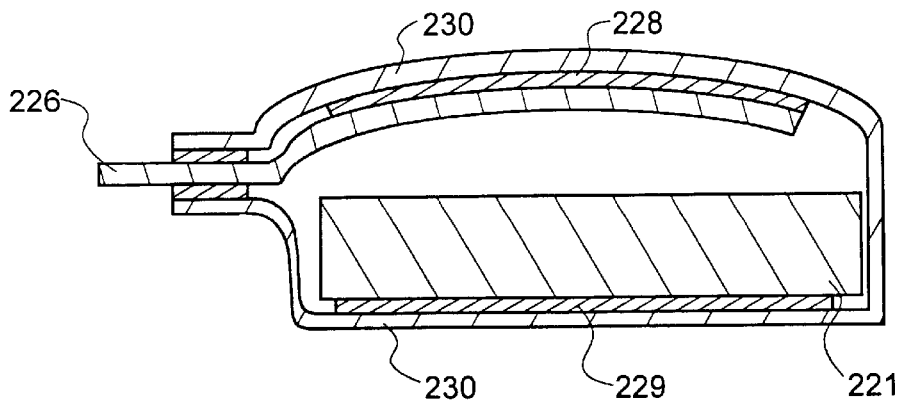
FIG. 13 is a view similar to FIG. 12, showing the envelope in the inflated state.

The electrochemical element used herein is not limited to the secondary battery of the multilayer structure shown in FIGS. 8 and 9, and secondary batteries of the wrap structure shown in FIGS. 11 to 13 and capacitors of similar structure may be equivalently used.

Referring to FIG. 11, a secondary battery 221 is constructed by winding a sandwich of electrolyte 224 between negative and positive electrodes 223 and 225. A tack tape 227 is attached at the end of the positive electrode 225 to maintain the structure wrapped. The negative and positive electrodes 223 and 225 have external electrodes (or out-leads) 222 and 226, respectively. It is seen from FIG. 12 that the external electrode 226 is connected to the internal electrode 225 by a relatively weak joint 231.

The secondary battery 221 is sealed in an envelope 230 as shown in FIG. 12. The secondary battery 221 including internal electrode (positive electrode) 225 is secured to the bottom of the envelope 230 with an adhesive 229. The external electrode 226 is secured to the top of the envelope 230 with an adhesive 228.

If the envelope 230 is inflated by any abnormal operation, the joint 231 between the external electrode 226 and the internal electrode 225 is broken so that the electrodes are suddenly separated as shown in FIG. 13.

The electrochemical device of the invention becomes advantageous when any of Embodiments 1 to 3 is applied. If desired, two or more of Embodiments 1 to 3 are combined. These combinations are arbitrary although the combination of all three embodiments ensures the best safety feature to the electrochemical device. The heat-sensitive protective component may be omitted if an electric equipment in which the electrochemical device is to be mounted is furnished with a protective circuit or if the circuitry associated therewith does not require.

The electrochemical element used in the electrochemical device of the invention is typically a lithium secondary battery, but not limited thereto. A capacitor of a similar structure may also be used.

The electrochemical device of the invention can be typically embodied as lithium secondary batteries and electric double-layer capacitors, which are described below.

Lithium Secondary Battery

The structure of a lithium secondary battery according to the invention is not critical, although it is generally constructed by a positive electrode, a negative electrode and an electrolyte and applied to lamination batteries and rectangular batteries.

The electrodes to be combined with the electrolyte are selected from well-known electrodes for lithium secondary batteries and are preferably formed of a composition comprising an electrode active material, a gel electrolyte and optionally, a conductive aid.

The negative electrode is composed of a negative electrode active material such as carbonaceous materials, lithium metal, lithium alloy or oxide materials while the positive electrode is composed of a positive electrode active material such as oxide or carbonaceous materials capable of intercalating and deintercalating lithium ions. Using such electrodes, a lithium secondary cell having satisfactory properties is obtainable.

The carbonaceous material used as the active material may be properly selected from mesocarbon microbeads (MCMB), natural or artificial graphite, resin fired carbon materials, carbon black, and carbon fibers. They are used in powder form. Preferred of these is graphite desirably having a mean particle size of 1 to 30 $\mu$m, especially 5 to 25 $\mu$m. Too small a mean particle size tends to lead to a shortened charge/discharge cycle life and an increased variation of capacity. Too large a mean particle size may lead to a remarkably increased variation of capacity and a reduced average capacity. Such a large mean particle size causes a variation of capacity because the contact between graphite and the current collector and the contact between graphite particles become inconsistent.

Compound oxides containing lithium are preferred as the oxide capable of intercalating and deintercalating lithium ions. Exemplary oxides are $LiCoO_2$, $LiMn_2O_4$, $LiNiO_2$, and $LiV_2O_4$. Powders of these oxides preferably have a mean particle size of about 1 to 40 $\mu$m.

Conductive aids are added to the electrode composition if desired. Preferred conductive aids include graphite, carbon black, carbon fibers, and metals such as nickel, aluminum, copper and silver. Graphite and carbon black are especially preferred.

Preferably the electrode composition contains the active material:conductive aid:gel electrolyte in a weight ratio of 30–90:3–10:10–70 for the positive electrode, and in a weight ratio of 30–90:0–10:10–70 for the negative electrode. The gel electrolyte used herein is not critical and selected from conventional ones. Electrodes free of the gel electrolyte are also acceptable. In this case, a binder such as fluoro-resin and fluoro-rubber is used in an amount of about 3 to 30% by weight.

Electrodes are prepared by first dispersing the active material and optional conductive aid in a gel electrolyte solution or binder solution to form a coating solution. The coating solution is then applied to a current collector. The coating means is not critical and may be properly determined in accordance with the material and shape of the current collector. In general, metal mask printing, electrostatic deposition, dip coating, spray coating, roll coating, doctor blade, gravure coating, and screen printing techniques are used. Thereafter, rolling is carried out by a platen press or calender roll if necessary.

The current collector may be properly selected from conventional current collectors in accordance with the shape of a device in which the battery is used and the manner of disposing the current collector in a casing. In general, aluminum and analogues are used for the positive electrode and copper, nickel and analogues are used for the negative electrode. The current collector is usually in the form of metal foil or metal mesh. Although the metal mesh has a lower contact resistance with the electrode than the metal foil, even the metal foil provides a sufficiently low contact resistance.

The solvent is then evaporated off, completing the electrode. The coating thickness is preferably about 50 to 400 $\mu$m.

The polymeric membrane used as the electrolyte is typically selected from polymeric microporous membranes of polyethylene oxide (PEO), polyacrylonitrile (PAN) and polyvinylidene fluoride (PVDF).

Also, separators may be used as disclosed in JP-A 9-219184, JP-A 2000-223107 and JP-A 2000-100408.

The positive electrode, polymeric membrane and negative electrode are stacked in this order and compressed, providing an electrochemical element.

The electrolytic solution with which the polymeric membrane is impregnated is generally composed of an electrolyte salt and a solvent. The electrolyte salts used herein include lithium salts such as $LiBF_4$, $LiPF_6$, $LiAsF_6$, $LiSO_3CF_3$, $LiClO_4$, and $LiN(SO_2CF_3)_2$.

[0046]

The solvent used in the electrolytic solution is not critical as long as it is compatible with the solid polymer electrolyte and electrolyte salt. For lithium batteries, polar organic solvents which do not decompose even at a high operating voltage are useful, for example, carbonates such as ethylene carbonate (abbreviated as EC), propylene carbonate (PC), butylene carbonate, dimethyl carbonate (DMC), diethyl carbonate and ethyl methyl carbonate, cyclic ethers such as tetrahydrofuran (THF) and 2-methyltetrahydrofuran, cyclic ethers such as 1,3-dioxolan and 4-methyldioxolan, lactones such as $\gamma$-butyrolactone, and sulfolane. Also useful are 3-methylsulfolane, dimethoxyethane, diethoxyethane, ethoxymethoxyethane, and ethyl diglyme.

In the electrolytic solution consisting of the solvent and the electrolyte salt, an appropriate concentration of the electrolyte salt is about 0.3 to 5 mol/l. The highest ion conduction is achieved at about 1 mol/l.

When the polymeric membrane is immersed in the electrolytic solution, the membrane absorbs the electrolytic solution and gels, becoming a solid polymer electrolyte.

When the composition of solid polymer electrolyte is represented by copolymer/electrolytic solution, a proportion of the electrolytic solution in a range of about 40 to 90% by weight is preferred for membrane strength and ion conduction.

Electric Double-Layer Capacitor

Although the structure of the electric double-layer capacitor is not critical, usually an electrolyte is interleaved between a pair of polarizing electrodes and an insulating gasket is disposed at the periphery of the polarizing electrodes and the gel electrolyte. Such an electric double-layer capacitor may be any of the paper and laminate types.

The polarizing electrodes are prepared by adding a binder such as fluoro-resin or fluoro-rubber to a conductive active material such as activated carbon or activated carbon fibers, and shaping the mixture into sheets serving as the electrodes. The content of the binder is about 5 to 15% by weight. A gel electrolyte may also be used as the binder.

A current collector made of platinum or conductive rubber such as conductive butyl rubber may be used in the polarizing electrodes. The current collector may also be formed by thermal spraying of metals such as aluminum and nickel. Metal mesh may be attached to one side of the electrode layer.

In the electric double-layer capacitor, the polarizing electrodes as described above are combined with a solid polymer electrolyte.

The polymeric membrane used as the electrolyte is typically selected from polymeric microporous membranes of polyethylene oxide (PEO), polyacrylonitrile (PAN) and polyvinylidene fluoride (PVDF).

The electrolyte salts used herein include $(C_2H_5)_4NBF_4$, $(C_2H_5)_3CH_3NBF_4$ and $(C_2H_5)_4PBF_4$.

Well-known non-aqueous solvents may be used in the electrolytic solution. Preferred are electrochemically stable non-aqueous solvents such as propylene carbonate, ethylene carbonate, 7-butyrolactone, acetonitrile, dimethylformamide, 1,2-dimethoxyethane and sulfolane alone or mixtures of any.

In the electrolytic solution consisting of the non-aqueous solvent and the electrolyte, an appropriate concentration of the electrolyte is about 0.1 to 3 mol/l.

When the polymeric membrane is immersed in the electrolytic solution, the membrane absorbs the electrolytic solution and gels, becoming a solid polymer electrolyte.

When the composition of solid polymer electrolyte is represented by copolymer/electrolytic solution, the preferred proportion of the electrolytic solution is about 40 to 90% by weight.

An insulator such as polypropylene and butyl rubber may be used as the insulating gasket.

The envelope is as described in Embodiment 1 although the envelopes of Embodiments 2 and 3 are also useful.

For example, the envelope is formed from a laminate film in the form of a metal layer such as aluminum which is coated on opposite surfaces with a thermal fusible resin layer such as a polyolefin resin layer (e.g., polypropylene or polyethylene) and a heat resistant polyester resin layer. A pair of laminate films are overlapped and joined along three sides by thermal fusion of the thermal fusible resin layers to form a first seal portion, obtaining a bag having one open side. Alternatively, one laminate film is folded and two opposite sides are joined by thermal fusion to form first seal portions, obtaining a bag having one open side.

The laminate film is preferably of a multilayer structure of thermal fusible resin layer/polyester resin layer/metal foil/ polyester resin layer from the inside to the outside in order to establish insulation between the metal foil in the laminate film and the output terminals of the electrochemical element. Since the use of such a laminate film permits the high-melting point polyester resin layer to be left intact during the thermal fusion, the spacing between the terminals and the metal foil of the envelope is maintained, ensuring insulation. To this end, the polyester resin layer of the laminate film should preferably have a thickness of about 5 to 100 microns.

EXAMPLE

Examples of the invention are given below by way of illustration and not by way of limitation.

Example A-1

Polypropylene (PP) and polyethylene (PE) were mixed in a predetermined ratio, milled at 190° C., and sheeted into a sheet of about 100 $\mu$m thick. The sheet was slit into strips of 5 mm wide.

As the envelope, a laminate film of PET (12 $\mu$m)/Al (20 $\mu$m)/PET (12 $\mu$m)/PP (80 $\mu$m) was folded and heat sealed, into a bag as shown in FIG. 1A. The PP layer was inside the bag. The first seal portions 21 were 8 mm wide.

Without insertion of an electrochemical element, a strip 23 was placed between laminate film edges and approximately at the center of the second seal portion 22. The strip 23 had a size of 5 mm on one side (the strip's own width). During the bag forming process, the strip was cut together with the open edges so that the other side of the strip had the same size (4 mm) as the second seal portion 22. The bag had overall dimensions of 56 mm×59 mm.

Figure 3:
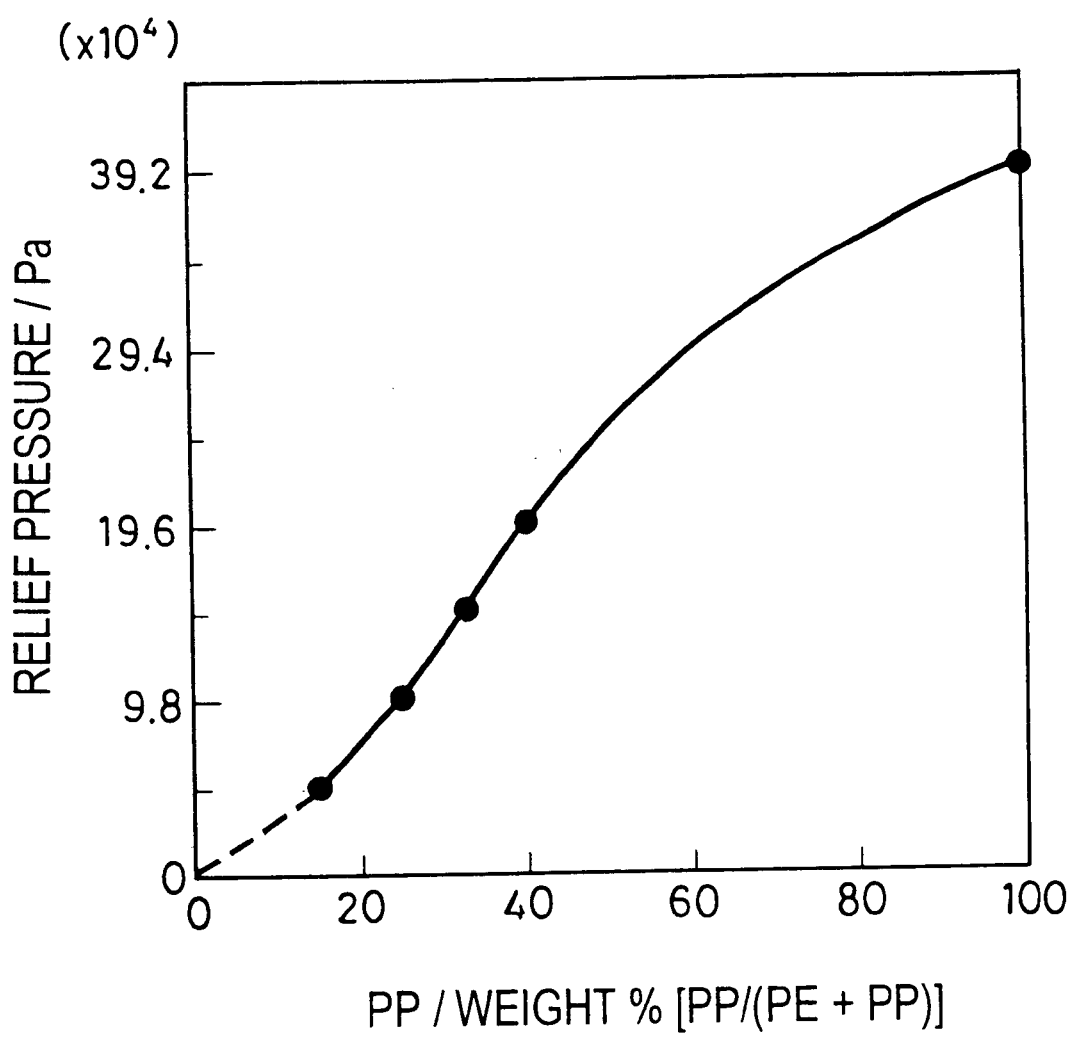
FIG. 3 is a graph showing a relief pressure versus a resin composition.

An air inlet port was formed in the major surface of the heat sealed envelope. Air was pumped into the envelope interior through the inlet port. The operating or relief pressure at which the strip 23 opened as a valve was measured. FIG. 3 is a graph showing a relief pressure (Pa) versus a resin composition, PP/(PE+PP) in % by weight.

It is seen from FIG. 3 that the relief pressure increases as the proportion in the strip-forming resin mixture of PP (which is the same as the innermost PP layer of the laminate film) increases. In order that the strip function as a pressure relief valve, an appropriate proportion of PP in the resin mixture is in a range of about 15 to 40% by weight.

Example A-2

An electrochemical device as shown in FIG. 1B was fabricated.

Positive electrodes were formed by applying a slurry of $LiCoO_2$, carbon black, graphite and PVDF in N-methylpyrrolidone (NMP) solvent onto an aluminum foil. For the convenience of battery construction, the positive electrodes were of two types, one having a coating on one surface of a 100-$\mu$m foil and one having coatings on both surfaces of a 20-$\mu$m foil. Negative electrodes were formed by applying a slurry of MCMB, carbon black, PVDF and NMP onto both surfaces of a copper foil of 10 $\mu$m thick. The separator used was a porous membrane of PVDF having a thickness of 40 $\mu$m.

The electrodes and separator were cut to a predetermined shape. These sheet sections were stacked in the order of positive electrode/separator/negative electrode/separator/ positive electrode . . . while applying a spot of adhesive to each sheet section at its center and fusing the adhesive at 110° C. The adhesive used was an ethylene/methacrylic acid copolymer. There was obtained an adhesively tacked laminate. Terminals were formed by welding aluminum and nickel ribbons to the positive and negative electrode tabs, respectively. The laminate was immersed in a solution containing 1 mol of $LiPF_6$ per liter of a mixture of EC and DMC in a volume ratio of 1:2. After gelation, the excessive electrolytic solution was removed. The amount of the electrolytic solution impregnated was 2.8 to 3.0 g.

The envelope sheet was a laminate film of PET (12 $\mu$m)/Al (20 $\mu$m)/PET (12 $\mu$m)/PP (80 $\mu$m) as used in Example 1, which was processed into a bag as shown in FIG. 1A. The PP layer was on the inside of the bag to come adjacent to the electrochemical element.

The laminate was inserted into the aluminum laminate bag through the open edge portion, a strip 23 was placed in the edge portion 22 as shown in FIG. 1B, and the edges were heat fused to form the seal portion 22. The entire assembly was heat pressed at 80° C. and $29.4 \times 10^4$ Pa (3 kgf/cm$^2$) for 1 minute for integrating the structure within the laminate bag.

The strip used was formed of a mixture of PP and PE in a weight ratio of 1/4 and of the same size as in Example 1.

The thus fabricated battery is designated sample No. 1. A battery designated sample No. 2 was fabricated by the same procedure as sample No. 1 except that the strip was omitted.

An over-charging test with a current flow of 1 ampere was effected on battery sample Nos. 1 and 2. For the normal seal battery (sample No. 2) without an explosion-proof valve, the envelope failed, sometimes with a fire hazard, before a charge quantity of 250% was reached. For the battery with an explosion-proof valve (sample No. 1), the valve smoothly opened when the envelope was inflated at a charging quantity of 200%, avoiding failure and ignition.

Battery sample No. 1 was aged at 60° C. and RH 90% for 20 days, finding no degradation of performance by moisture ingress (such as bulging of the battery).

Example A-3

An electrochemical device as shown in FIG. 2B was fabricated.

By using an electrochemical element and a laminate film as in Example A-2, placing the electrochemical element in the recess 31 of the envelope sheet 30 as shown in FIG. 2A, placing the strip 34 in the seal-forming portion 33, and folding the envelope sheet at the line 32, a battery was fabricated. The battery had overall dimensions of 62 mm×42 mm (excluding projecting terminals). The seal portion 33 was 4 mm wide on the side where the terminals extended and 4 mm wide on the other sides. The strip 34 was made of the same material as in Example 1 and had dimensions of 4 mm×5 mm, with one side being equal to the width of the seal portion.

The thus fabricated battery is designated sample No. 3. A battery designated sample No. 4 was fabricated by the same procedure as sample No. 3 except that the strip was omitted.

An over-charging test was effected on battery sample Nos. 3 and 4 as in Example A-2. The results were the same as in Example A-2 corresponding to the presence or absence of the strip. Sample No. 3 was subjected to an aging test as in Example A-2, finding no degradation of performance by moisture ingress.

Example A-4

Four battery samples were fabricated as in Examples A-2 and A-3 except that polyethylene (PE) was used instead of PP on the inside of the laminate film and the strip was made of a resin mixture of PE and PP in a weight ratio of 1/4. These samples were examined by the same tests as in Examples A-2 and A-3. The results were the same as in Examples A-2 and A-3 corresponding to the presence or absence of the strip.

Example B-1

Figure 6:
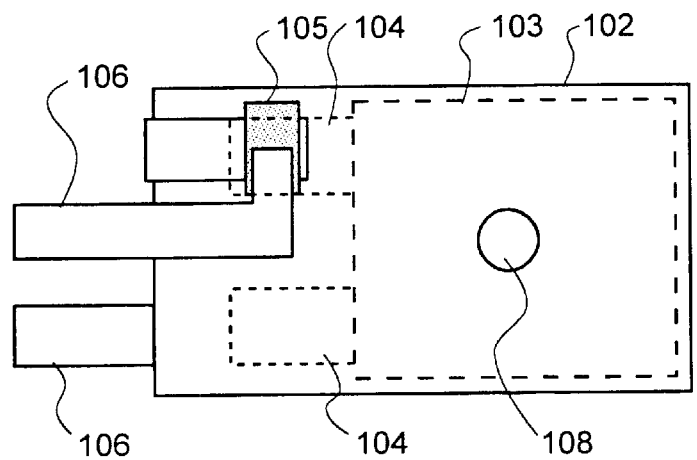
FIG. 6 is a plan view of the electrochemical device used in Example B-1.

Using a polyimide base adhesive tape, a PTC thermistor 105 of 0.5 mm thick having a resistance of 8 m$\Omega$ at room temperature and a nominal operating temperature of 75° C. was attached to a battery having a maximum thickness of 4.0 mm at the position shown in FIG. 6. After the attachment of the PTC thermistor, the battery had a maximum thickness of 4.0 mm. No heat conductive paste was applied between the thermistor and the envelope. Using a polyimide base adhesive tape, a K type thermocouple 108 was attached to the battery at the position shown in FIG. 6 for measuring the temperature of the battery surface. The battery was charged up to a terminal voltage of 8.0 V by conducting a constant current of 2.2 A. Thereafter, charging was continued while the current was controlled so as to maintain the voltage of 8.0 V.

After about 16 minutes from the start of the test, the battery surface reached a temperature of about 66° C. at which the PTC thermistor operated. Due to the increased resistance of the PTC thermistor, the terminal voltage increased from 4.7 V to 8 V and thereafter, the current flow declined. Even after 2 hours from the start of charging, the current flow did not increase beyond 200 mA. Neither failure nor ignition occurred.

Example B-2

Figure 7:
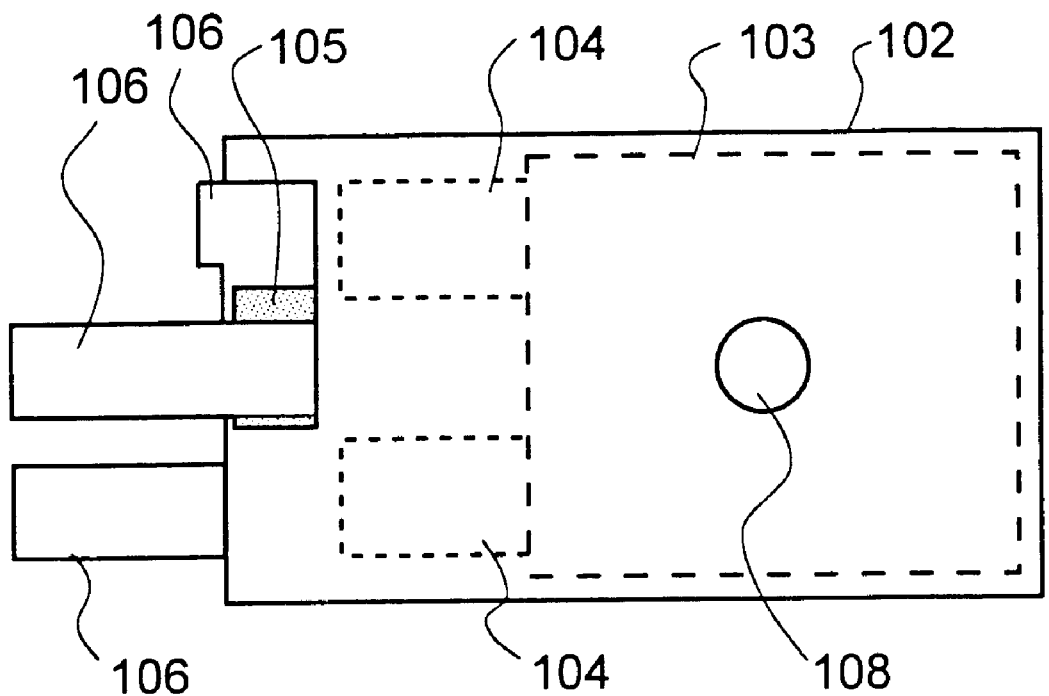
FIG. 7 is a plan view of the electrochemical device used in Example B-2.

The charging test was carried out as in Example B-1 except that the PTC thermistor 105 was placed at the position shown in FIG. 7.

After about 20 minutes from the start of the test, the battery surface reached a temperature of about 82° C. at which the PTC thermistor operated. Due to the increased resistance of the PTC thermistor, the terminal voltage increased from 4.7 V to 8 V and thereafter, the current flow declined. Even after 2 hours from the start of charging, the current flow did not increase beyond 200 mA. Neither failure nor ignition occurred. However, the temperature rose beyond about 90° C. at maximum, so that the envelope was inflated by the gas generated.

Since the batteries used in these examples were relatively small sized, the attachment position of the PCT thermistor had little influence. For large size batteries for use in personal computers, the attachment position of the PCT thermistor will have more influence.

Comparative Example B

The charging test was carried out as in Example B-1 except that the PTC thermistor was omitted.

The terminal voltage increased to 4.67 V at maximum. After about 29 minutes from the start of the test, failure and ignition occurred.

It is noted that although the PTC thermistor was used as the heat-sensitive protective component in Examples B-1, B-2 and Comparative Example B, substantially equivalent results were obtained on use of a thermal fuse.

Example C

A battery of the construction shown in FIG. 8 was fabricated by alternately stacking negative electrodes, gel electrolyte layers and positive electrodes. An aluminum foil lead 203 serving as the external electrode was welded to the tap of the positive electrode collector 204 serving as the internal electrode, by means of a ultrasonic welder. A nickel foil was welded to the tap of the negative electrode collector 206, by means of an electric resistance welder. The joint (211) between the positive electrode 204 tab and the lead 203 had a tensile strength of 63 gf/mm$^2$.

This was inserted into an envelope 202 made of an aluminum laminate film. The lead 203 was joined to the laminate film 202 with maleic acid-modified polypropylene (208). The joint (208) between the lead and the laminate film had a tensile strength of 63 gf/mm$^2$. The opening of the laminate film was sealed in vacuum, completing the battery.

The battery was charged up to a terminal voltage of 5.0 V by conducting a constant current of 1.0 ampere. Thereafter, charging was continued while the current was controlled so as to maintain the voltage of 5.0 V. After about 66 minutes from the start of the test, the envelope started to inflate due to gas generation. About 30 seconds later, the joint between the positive electrode collector tab and the lead was broken whereby the current flow was shut off.

The current blocked state was then kept, inhibiting failure and ignition.

Comparative Example C

The charging test was carried out as in Example C except that neither the positive electrode collector tab nor the lead was adhesively joined to the laminate film.

After about 65 minutes from the start of the test, the envelope started to inflate due to gas generation. The current continued, provoking failure and ignition after 70 minutes from the start of the test.

Although the explosion-proof mechanism, protective component and current shut-off mechanism are independently assessed in the above Examples, the electrochemical device can be made more safe by combining two or more of them. In particular, better results were obtained from a combination of Example A with Example C.

There has been described a reliable and safe electrochemical device having a simple venting means for venting gas in response to a rise of the internal pressure, the venting means serving as an explosion-proof valve and preventing ingress of moisture and contaminants. There has also been described an electrochemical device comprising an envelope of flexible film having a protective component attached thereto, which is designed, without changing the maximum thickness of the device, to ensure that heat is transferred from the interior to the protective component whereby the device has improved safety. There has also been described an electrochemical device, typically secondary battery, comprising an envelope of flexible film and a failsafe mechanism capable of preventing current flow on a gas generating accident.

Japanese Patent Application Nos. 2000-75988, 2000-181676 and 2000-181677 are incorporated herein by references.

What is claimed is:

1. An electrochemical device comprising
an envelope having a sealable opening,
an electrochemical element having terminals, said electrochemical element being inserted in said envelope through the opening which is sealed to form a seal,
said envelope having a resin layer on its inner side adjacent said electrochemical element, and
a strip of a material different from the resin layer of said envelope, disposed in at least a portion of the seal, said strip serving as a means for relieving pressure within said envelope.

2. The electrochemical device of claim 1 wherein the sealable opening of said envelope is defined by opposed portions of the resin layer of the envelope, said strip is interposed at least in part between the opposed portions of the resin layer, and a seal is formed by joining the opposed portions of the resin layer together with said strip to provide the pressure relief means.

3. The electrochemical device of claim 1 wherein said strip is made of a resin mixture of a first resin adhesive to the resin layer of the envelope and a second resin non-adhesive to the resin layer.

4. The electrochemical device of claim 1 wherein the resin layer of the envelope is made of a first polyolefin resin, and said strip is disposed in contact with the resin layer and made of a resin mixture of the first polyolefin resin and a second polyolefin resin non-adhesive to the first polyolefin resin.

5. The electrochemical device of claim 4 wherein the resin mixture of which said strip is made contains a more amount of the second polyolefin resin than the first polyolefin resin.

6. The electrochemical device of claim 5 wherein the resin mixture of which said strip is made contains the first polyolefin resin and the second polyolefin resin in a weight ratio of from 40/60 to 15/85.

7. The electrochemical device of claim 4 wherein either one of the first and second polyolefin resins comprises polypropylene, and the other resin comprises polyethylene.

8. The electrochemical device of claim 1 wherein the terminals extend through the seal of said envelope, and said strip is disposed in the portion of the seal excluding the location of the terminals.

9. An electrochemical device comprising
an envelope,
an electrochemical element received and sealed in the envelope, and
a heat-sensitive protective component for protecting the electrochemical element, said heat-sensitive protective component being attached to said envelope substantially outside said electrochemical element.

10. The electrochemical device of claim 9 wherein the electrochemical device has a maximum thickness $D_1$ where said electrochemical element is received and a maximum thickness $D_2$ where said heat-sensitive protective component lies, $D_1$ being equal to or greater than $D_2$.

11. The electrochemical device of claim 9 further comprising an internal electrode extending from said electrochemical element, a tab extending from the internal electrode, and an external electrode extending from the tab, wherein said heat-sensitive protective component lies at the location where any of the internal electrode, the tab and the external electrode is disposed.

12. The electrochemical device of claim 9 which comprises a lithium secondary battery.

13. The electrochemical device of claim 9 wherein said envelope has a resin layer on its inner side adjacent said electrochemical element, and
a strip of a material different from the resin layer of said envelope, disposed in at least a portion of the seal, said strip serving as a means for relieving pressure within said envelope.

14. The electrochemical device of claim 9 wherein the heat-sensitive protective component is attached outside the envelope.

15. The electrochemical device of claim 9 wherein the heat-sensitive protective component is attached inside the envelope.

16. An electrochemical device comprising a flexible envelope, an electrochemical element received and sealed in said envelope, said electrochemical element including internal electrodes and external electrodes electrically connected to the internal electrodes and extending outside said envelope, and current shut-off means for shutting off either of the electrical connections between the internal electrodes and the external electrodes by detecting the stress created by inflation of said envelope.

17. The electrochemical device of claim 16 wherein said current shut-off means breaks the mechanical connection between the internal electrode and the external electrode by utilizing the stress.

18. The electrochemical device of claim 16 wherein the internal electrode and the external electrode are attached to the envelope such that the connection between the internal electrode and the external electrode is preferentially broken by the stress.

19. The electrochemical device of 16 wherein the internal electrode is attached to the envelope at a tensile strength A, the external electrode is attached to the envelope at a tensile strength B, and the internal electrode is connected to the external electrode at a tensile strength C such that C is lower than A, and C is lower than B.

20. The electrochemical device of which comprises a lithium secondary battery.

21. The electrochemical device of claim 16 wherein said envelope has a resin layer on its inner side adjacent said electrochemical element, and a strip of a material different from the resin layer of said envelope, disposed in at least a portion of the seal, said strip serving as a means for relieving pressure within said envelope.

22. The electrochemical device of claim 16 which has a heat-sensitive protective component for protecting the electrochemical element, said heat-sensitive protective component being attached to said envelope substantially outside said electrochemical element.

23. The electrochemical device of claim 22, wherein said envelope has a resin layer on its inner side adjacent said electrochemical element, and a strip of a material different from the resin layer of said envelope, disposed in at least a portion of the seal, said strip serving as a means for relieving pressure within said envelope.

* * * * *

UNITED STATES PATENT AND TRADEMARK OFFICE
CERTIFICATE OF CORRECTION

PATENT NO. : 6,653,018 B2
DATED : November 25, 2003
INVENTOR(S) : Tetsuya Takahashi et al.

It is certified that error appears in the above-identified patent and that said Letters Patent is hereby corrected as shown below:

<u>Title page,</u>
Item [75], Inventors, should read

-- [75] Inventors: Tetsuya Takahashi, Tokyo (JP);
                  Toshinobu Miyakoshi, Tokyo (JP);
                  Tsuyoshi Iijima, Tokyo (JP);
                  Kazuya Ogawa, Tokyo (JP);
                  Satoshi Maruyama, Tokyo (JP) --;

<u>Column 22,</u>
Line 3, "device of which comprises" should read -- device of claim 16 which comprises --.

Signed and Sealed this

Twentieth Day of April, 2004

JON W. DUDAS
*Acting Director of the United States Patent and Trademark Office*